United States Patent [19]

Blume, Jr.

[11] Patent Number: 4,875,186
[45] Date of Patent: Oct. 17, 1989

[54] PERIPHERAL EMULATION APPARATUS

[75] Inventor: Carl R. Blume, Jr., Newton, Mass.

[73] Assignee: Prime Computer, Inc., Natick, Mass.

[21] Appl. No.: 834,751

[22] Filed: Feb. 28, 1986

[51] Int. Cl.[4] ............................................. G06F 13/00
[52] U.S. Cl. ................................................... 364/900
[58] Field of Search ... 364/200 MS File, 900 MS File, 364/300

[56] References Cited

U.S. PATENT DOCUMENTS

| | | | |
|---|---|---|---|
| 3,955,180 | 5/1976 | Hirtle | 364/200 |
| 4,031,517 | 6/1977 | Hirtle | 364/200 |
| 4,484,266 | 11/1984 | Becker et al. | 364/900 |
| 4,495,564 | 1/1985 | Draper et al. | 364/200 |
| 4,641,261 | 2/1987 | Dwyer et al. | 364/900 |
| 4,641,263 | 2/1987 | Perlman et al. | 364/900 |
| 4,649,479 | 3/1987 | Advani et al. | 364/300 |
| 4,649,514 | 3/1980 | Berger | 364/900 |
| 4,660,170 | 4/1987 | Hui et al. | 364/900 |
| 4,674,089 | 6/1987 | Poret et al. | 364/200 |
| 4,680,732 | 7/1987 | DiCenzo | 364/900 |
| 4,695,945 | 9/1987 | Irwin | 364/200 |
| 4,701,848 | 10/1987 | Clyde | 364/900 |
| 4,707,803 | 11/1987 | Anthony, Jr. et al. | 364/900 |
| 4,800,523 | 1/1989 | Gerety et al. | 364/900 |

OTHER PUBLICATIONS

IBM Tech. Bulletin, "Device Independent Printer Attachment", vol. 20, No. 6, Nov./77, pp. 2187–2188.
IBM Tech. Bulletin, "Parallel Interface Printer Simulator", vol. 28, No. 9, Feb./86, pp. 3976–3977.

Primary Examiner—Gareth D. Shaw
Assistant Examiner—Viet Nguyen
Attorney, Agent, or Firm—Wolf, Greenfield & Sacks

[57] ABSTRACT

Control apparatus allows application software written for use with peripheral devices manufactured by one company to run with other peripheral devices. The apparatus intercepts device-specific control commands generated by the software and translates the commands into commands which are compatible with the peripheral connected to the system. Non-device specific commands are passed untranslated through the control apparatus to the peripheral. More specifically, registers within the control apparatus which must be programmed with parameters unique to a particular peripheral cannot be accessed by the application software while other nonspecific registers remain read and write accessible. Peripheral-specific parameters are instead changed by a secondary processor which uses special hardware to minimize interference with the main processor.

19 Claims, 2 Drawing Sheets

PERIPHERAL EMULATION APPARATUS

FIELD OF THE INVENTION

This invention relates to input/output processing circuitry for data processing equipment and, in particular, to computer peripheral control apparatus.

BACKGROUND OF THE INVENTION

There are presently available a large variety of computer software application programs which are productive and useful for a large number of users. Typically, these programs are written to run on a computer manufactured by a particular manufacturer. Since, in most cases a program written from one type of computer will not run on a computer manufactured by another company, several versions of the same program are written—one version for each different computer. However, there are many programs which cannot be used by some computer owners because a program version has not been written for the type of computer that they own.

The one-to-one correspondence between the software version and the underlying computer hardware must occur even if two different computers use the same internal microprocessor chip because the software generally controls certain parameters of the system which are unique to a computer system manufactured by one company.

More specifically, many widely-used programs control the computer peripherals in a direct manner so that a program designed for one computer may not run on another computer due to the fact that the computer peripherals are different. Often differences in peripherals can be accommodated by means of additional software routines called "emulator" routines which are special software peripheral driver routines which translate between parameters generated by the application software and the parameters required to operate a given peripheral.

In other cases however, such program solutions are not available. This is because the main application program contains its own peripheral driver routines which program directly the hardware circuits that control an associated peripheral. For example, in order to save processing time, most conventional computers use dedicated circuitry to control the display of information on the computer's monitor. Such circuitry is usually designated a CRT controller and contains a plurality of internal registers that set monitor characteristics such as screen resolution, refresh rate and number of raster lines. The CRT controller registers can generally be loaded with appropriate parameters by driver software running in the system. Many popular software application programs which have their own driver routines directly program the CRT controller by loading parameters into its various registers so that it operates with a particular CRT monitor. When such software is used on a system other than that for which it was written, it will not operate properly because the software-programmed CRT controller contains incorrect parameters for the different monitor. Thus the application program either cannot be used on the computer system or a special version for that computer system and peripherals must be written.

Therefore, it is an object of the present invention to provide emulation circuitry which will allow an application program to run on a computer system other than the one for which it was written.

It is another object of the present invention to provide emulation circuitry which can convert peripheral parameters passed by an application program to a peripheral controller into peripheral parameters which are useful with a peripheral device that is different from the device for which the application program was written.

It is yet another object of the present invention to perform hardware emulation in a manner that is transparent to the application program.

It is a further object of the present invention to perform hardware emulation in a straight-forward and simple manner.

It is a still further object of the present invention to provide hardware emulation circuitry in which peripheral emulation hardware prevents the processor from accessing registers within the peripheral device controller which contain peripheral device-specific parameters.

It is yet a further object of the present invention to allow the processor to access registers in the peripheral device controller which do not contain peripheral device-specific parameters.

It is yet a further object of the present invention to provide peripheral emulation hardware in which peripheral-specific parameters in the peripheral controller are programmed by a second processor, without interfering with the operation of the primary processor.

SUMMARY OF THE INVENTION

The foregoing objects are achieved and the foregoing problems are solved in one illustrative embodiment of the invention in which peripheral emulation hardware controls the access of the processor to peripheral device-specific registers in the peripheral device controllers. In particular, registers within the peripheral device controller which are normally programmed with device-specific parameters by the application software are instead controlled by a secondary processor under control of emulation software stored in an associated read-only memory.

More specifically, special-purpose hardware monitors the operation of the primary processor to detect a write operation to a register in the peripheral device controller. The special-purpose hardware enables or disables the write operation dependent upon whether the intended register contains peripheral device-specific parameter.

If the attempted primary processor access is to a register containing a peripheral device-specific parameter, the primary processor write operation is disabled and the secondary processor loads an alternate parameter into the register through an alternative data path. The alternate parameter is the correct parameter for the peripheral which is actually attached to the system.

In order to prevent interference between the operations of the two processors, the secondary processor sets a "flag" signal during its loading operation. If the primary processor executes an instruction which attempts to access the peripheral device controller while the "flag" is set, special-purpose hardware temporarily halts the primary processor until the secondary processor completes updating of parameter values.

DETAILED DESCRIPTION OF THE PREFERRED EMBODIMENT

Figure 1:
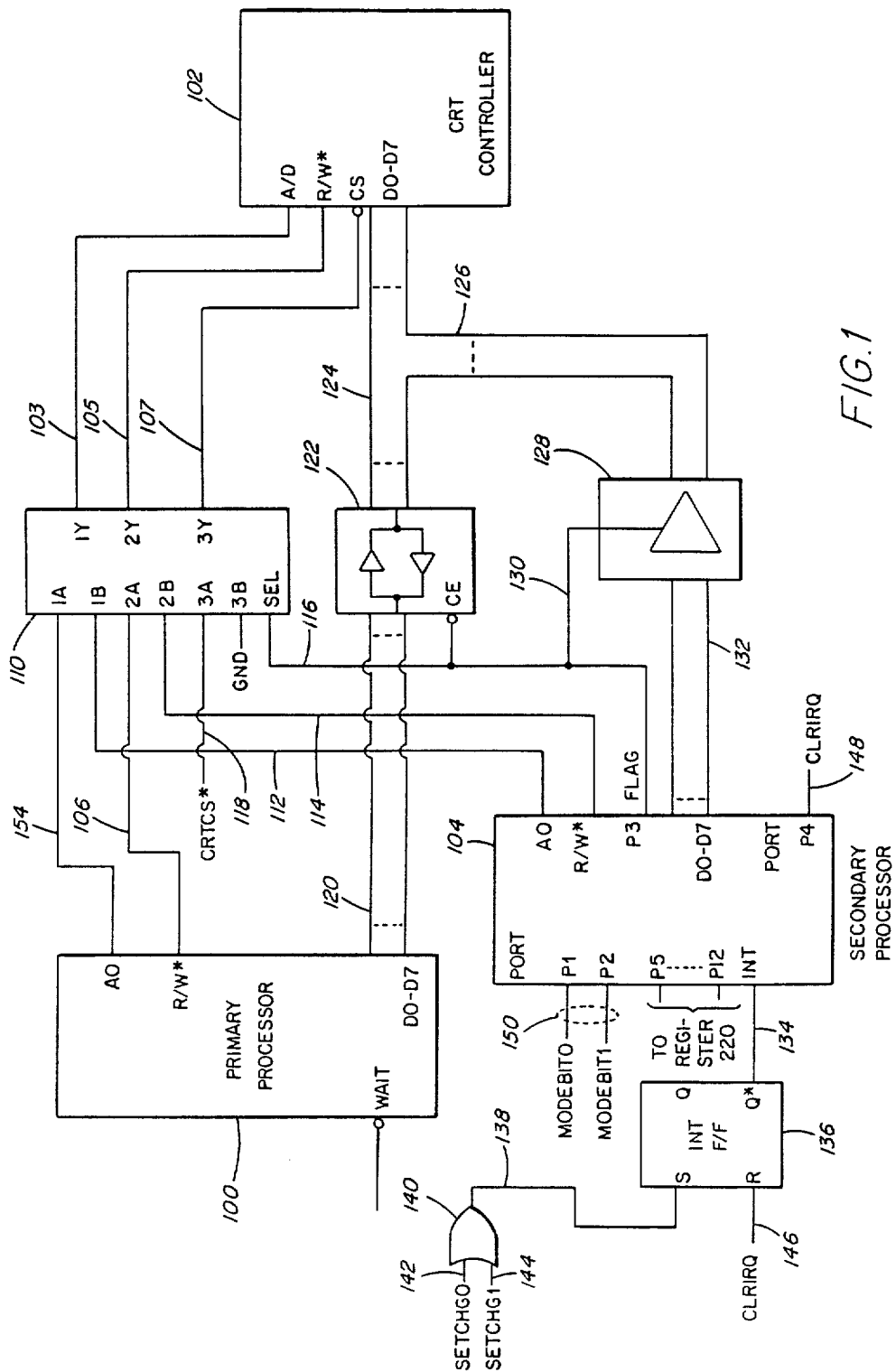
FIG. 1 is a electrical schematic diagram showing the interconnection of the primary and secondary processors to a peripheral device controller.

The present invention is typically useful in a personal computer in which it is desirable to run programs that were originally written for a personal computer manufactured by a different company. As mentioned above, when software is run on a computer other than the computer for which the software was written, the software often tries to write device-specific parameters in the CRT controller that controls the computer's display monitor. In FIG. 1, primary processor 100 corresponds to the microprocessor normally found in the computer and is controlled by the application software. In the illustrative embodiment, processor 100 is a conventional eight-bit microprocessor, although other types of processors can also be used with the invention. Processor 100 has a plurality of outputs including sixteen address leads designated as leads A0–A15 (only one of which, A0, is shown in FIG. 1), eight data leads, designated as leads D0–D7, and control output leads including a read/write output lead, R/W* (in the description below an asterisk is used to indicate that the associated signal is active in the "low" state).

The address, data and read/write outputs are used, among other things, to control the operation of the CRT peripheral controller as will hereinafter be described. In addition, processor 100 has an input (WAIT) which causes it to temporarily halt operation in response to a "low" signal applied to the input. The WAIT input is used, as will hereinafter be described in detail, by secondary processor 104 to temporarily halt operation of processor 100 in a situation where both processors are attempting to access registers in the peripheral controller.

Also shown in FIG. 1 is secondary processor 104. Processor 104 may illustratively be a conventional eight-bit microprocessor although, as with processor 100, other types of processors can be used. A processor suitable for use with the illustrative embodiment is a Model 8039 manufactured by the Intel Corporation located at Santa Clara, Calif. Processor 104 is programmed by instructions contained in a read-only memory (not shown) which causes it to operate as described below. A suitable program can readily be constructed with conventional programming tools and will not be described in detail hereinafter.

Secondary processor 104 also has a plurality of input and outputs. Among these are input/output ports designated as ports P1–P12. Ports P1–P12 are used by processor 104 to interact with the remainder of the circuitry. Ports P1–P12 actually consist of registers which can be read from or written to by processor 104. In order to sense certain input conditions, processor 104 reads the register associated with a port which register has previously been written by external circuitry. For example, ports P5–P12 may be connected to address decoder and register 220 (FIG. 2) to read the value of signals placed there by processor 100. In order to control a portion of its environment, processor 104 writes a signal to a port which signal is used by external circuitry. For example, port P3 is used to generate a signal designated as the signal "FLAG" which, as will hereinafter be described, is used to control the connection of processors 100 and 104 to the CRT controller 102.

In addition, in a similar fashion to processor 100, processor 104 has address outputs A0–A11 (only one of which, A0, is shown in FIG. 1), data outputs D0–D7 and a read write output (R/W*). Processor 104 also has a plurality of control inputs and outputs including an interrupt input (INT). The INT input, in a conventional fashion, can be used to temporarily stop the operation of processor 104 and cause it to execute a predetermined software routine.

In the illustrative embodiment, peripheral device controller 102 is a conventional CRT controller. The inventive technique may also be used with other types of peripheral controllers. Illustratively, a Model MC6845 video display controller manufactured by Motorola Incorporated, Semiconductor products Division, located at Phoenix, Ariz. is shown. Device 102 has eighteen internal registers which can be programmed to produce various effects on the associated display monitor (not shown). Various parameters in the internal registers control monitor characteristics such as horizontal synchronization pulse width, vertical synchronization pulse width, screen resolution, video bandwidth and other parameters which determine the appearance of the display on the monitor screen.

Of the eighteen internal registers in CRT controller 102, ten are programmed to contain parameters that are specific to a particular CRT monitor. Seven other registers contain parameters which are not device-specific, for example, cursor position, and the starting address of the video memory. The remaining register is an "index" register which can be written with an address code to select which of the other seventeen registers will be accessed by processors 100 and 104.

CRT controller 102 also has a plurality of inputs including data inputs D0–D7, address/data input A/D, a read/write input (R/W*) and a chip select input (CS). In order to perform any read or write operation a "low" signal must be provided to the chip select input, CS, which enables the controller. The signal on the read/write input (R/W*) then controls whether a register is to be read or written.

Since CRT controller 102 has only eight data input leads, a multiplexing operation must be used to first select the register which is to be accessed and then present the data for writing. In accordance with conventional construction, the address/data port A/D of controller 102 is used to indicate whether the signals on data leads D0–D7 is a register address code for entry into the index register or data for writing into a register. If a "low" signal is applied to the A/D input, controller 102 interprets the signals on lead D0–D7 as an address selecting one of the seventeen internal registers. Accordingly, this address information is written into the internal index register under control of the R/W* signal. If a "high" signal is applied to the A/D input, controller 102 interprets the signals on leads D0–D7 as data for entry into an internal register selected by an address code previously loaded into the index register.

When the computer system is operating normally, the A/D input of controller 102 is driven by address output A0 of processor 100. Similarly, the R/W* input of controller 102 is driven by the R/W* output of processor 100. The chip select (CS) input is driven by an address decoder (not shown) which decodes the address signals on processor address leads A0–A15 to generate a signal CRTCS* which enables controller 102. Data inputs D0–D7 of CRT controller 102 are provided with address and data information from data leads D0–D7 of processor 100 over data busses 120 and 124.

In accordance with the invention, the normal data and signal transfer paths between processor 100 and controller 102 are interrupted by devices which can be controlled by secondary processor 104. As will hereinafter be described in connection with FIG. 2, additional circuitry is provided which selectively enables or disables access by processor 100 to individual registers in CRT controller 102.

In addition, secondary processor 104 controls the interaction of processor 100 and CRT controller 102 by means of conventional tri-state buffer units 122 and 128 and multiplexer 110. Buffer units 122 and 128 and multiplexer 110 are controlled by the output signal FLAG generated by processor 104—a "low" FLAG signal output on the P3 port of processor 104 causes primary processor 100 to be connected directly to CRT controller 102. Conversely a "high" FLAG signal disconnects processor 100 from CRT controller 102 and connects processor 104 to CRT controller 102 to allow processor 104 to write the necessary parameters into appropriate registers of controller 102.

More specifically, a "low" FLAG signal on the P3 port of processor 104 is applied, via lead 130, to buffer unit 128. The "low" signal causes the buffer unit to go into its high-impedance output condition effectively disconnecting bus 126 from bus 132. In addition, the "low" FLAG signal is applied to the enable input of buffer unit 122 which causes it to connect bus 124 to bus 120 of processor 100.

The "low" output is also applied, via lead 116, to the select input of multiplexer 110. Multiplexer 110 is a conventional two-to-one, three-port multiplexer which can connect either the A input set (inputs 1A, 2A, 3A) to outputs 1Y, 2Y and 3Y or the B input set (inputs 1B, 2B, 3B) to outputs 1Y, 2Y and 3Y under control of signals appearing at the select (SEL) input. A "low" signal appearing at the SEL input causes multiplexer 110 to connect its A input set to its outputs.

Thus a "low" FLAG signal generated by processor 104 causes the A0 address signal generated by processor 100 on lead 154 to be connected to the A/D input of controller 102 via lead 103. Similarly, the read/write signal output of processor 100 on lead 106 is connected to the R/W* input (via lead 105) of controller 102. The CS input on lead 107 of controller 102 is connected to signal CRTCS* on lead 118 which, as previously described, is generated by address decoding circuitry when processor 100 desires to access controller 102.

In the event that secondary processor 104 desires to obtain write access to CRT controller 102, it places a "high" FLAG signal on its P3 port. This "high" signal is applied, via lead 130, to buffer unit 128 causing it to connect data bus 132 of processor 104, via bus 126, to the data inputs (D0–D7) of controller 102. Similarly, the high" signal at P3 port of processor 104 is applied to the chip enable (CE) input of buffer unit 122 causing it to enter a high-impedance state, thus effectively disconnecting data bus 120 of processor 100 from the data inputs of controller 102.

The "high" FLAG signal is also applied, via lead 116, to the SEL input of multiplexer 110, causing it to connect its B input set to outputs 1Y, 2Y and 3Y. Thus, the A0 address signal generated by processor 104 (on lead 112) is connected to the A/D input of controller 102 over lead 103. Similarly, the read write output R/W* of processor 104 on lead 114 is applied to the read/write input 105 of controller 102. The chip select input, CS, of controller 102 is connected, via lead 107 and input 3B of multiplexer 110 to a "ground" signal which causes controller 102 to be enabled for a read/write operation from processor 104.

Figure 2:
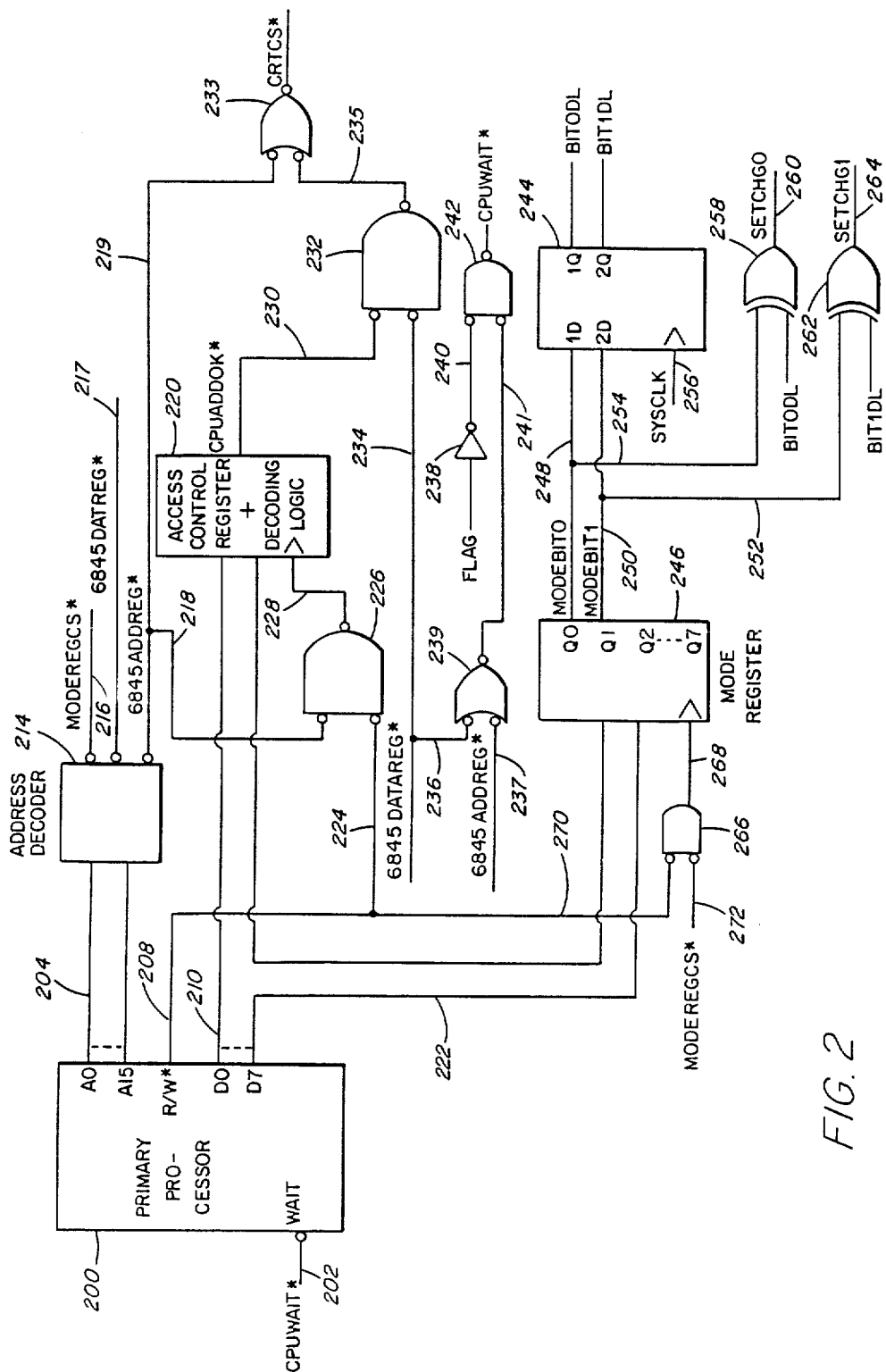
FIG. 2 is a electrical block schematic diagram showing decoding circuitry which alerts the secondary processor when the primary processor has attempted or will attempt to access a device-specific register in the peripheral device controller.

The operation of processors 100 and 104 is coordinated by means of circuitry which is shown at the left hand side of FIG. 1 and in FIG. 2. This circuitry ensures that the proper information will be provided to controller 102 without any direct intervention of the application program executing on processor 100. Thus, the operation of processor 104 is "transparent" to processor 100 and the application program which is executing in processor 100 will operate with the a peripheral even though the peripheral is not the peripheral with which the application software was designed to operate.

More specifically, referring to FIG. 2, primary processor 200 (corresponding to processor 100 in FIG. 1) coordinates and controls the computer by means of conventional decoders and registers, including address decoder 214 and mode register 246. Address decoder 214 receives the address outputs A0–A15 of primary processor 200 over bus 204. In accordance with conventional operation, predetermined patterns of these address outputs are decoded to generate a number of enabling outputs which are used to select or enable various components in the computer circuitry. Three of these enabling outputs are the mode register enabling signal MODEREGCS* generated on lead 216 and two CRT controller enabling signals, the 6845ADDREG* signal on leads 219 and 218 and the 6845DATREG* signal on lead 217. Other signals (not shown) may be used to control additional elements in the computer system. Specifically, in accordance with the address signals appearing on address bus 204, address decoding circuit 214 places a "low" signal on one of its enabling output leads to select the appropriate element.

Mode register 246 can be controlled by processor 200 to set various operational modes of the computer circuitry. For example, mode register 246 can be used to control the clocking rates which, in turn, control CRT resolution at the system monitor and may be used to control other parameters which are used to physically control the operational state of the circuitry. Processor 200 controls mode register 246 by writing digital information into it. This digital information consists of a plurality of mode bits which appear at the registers outputs Q0–Q7. This latter write operation is performed under control of address decoder 214 which, in response to a preselected pattern of address signals on processor address leads A0–A15, applies a "low" MODEREGCS* signal to its output lead 216. The "low" MODEREGCS* signal is applied, via lead 272, to the lower input of gate 266.

Processor 200 then applies the mode information to its data leads D0–D7 which signals are forwarded, via bus 222, to the data inputs of register 246. Simultaneously, processor 200 applies a "low" write signal, via leads 208 and 270, to the upper input of gate 266. Gate 266 is thus enabled and applies a "low" signal to its output 268, which "low" signal is applied to the clock input of register 246, in turn, clocking in the mode information on bus 222.

In accordance with the invention, circuitry is provided which activates secondary processor 104 in the event that primary processor 200 makes changes in mode register 246 which requires corresponding changes to device-specific registers in CRT controller 102. This circuitry consists of address decoder and register 220, gates 226, 232, 238 and 242, and mode bit delay register 244 shown in FIG. 2 and gates 258, 262 and 140 and interrupt flip/flop 136 shown in FIG. 1.

More specifically, the control circuitry monitors changes in information stored in mode register 246 to determine when processor 200 has changed the mode control information. To do this, the circuitry monitors changes in mode register bits 0 and 1 at register outputs Q0 and Q1. The bit signals are provided, via leads 248 and 250, to delay register 244 and, via leads 252 and 254 to exclusive-OR gates 258 and 262. Register 244 and gates 258 and 262 are used to generate a pulse for one system clock period each time a change occurs in mode bits 0 or 1.

In particular, the mode bit 0 and 1 signals are clocked into register 244 under control of the system clock (SYSCLK) which is applied, via lead 256, to the clock input of register 244. Register 244 is a conventional D-type register and, thus, its outputs will not be the same as its inputs for one clock period after each change in the value of either or both mode bits 0 and 1. The delayed outputs BIT0DL and BIT1DL are provided to the lower inputs of exclusive-OR gates 258 and 262, respectively. Consequently, after each change in mode bits 0 and 1 the inputs to gates 258 and 262 will be different for one clock period, but will become the same after one clock period when the bit values are clocked into register 244.

Thus, the outputs SETCHG0 and SETCHG1 of gates 258 and 262 will become "high" for one time interval of the system clock each time either bit 0 or bit 1 changes state. The outputs of gates 258 and 262 are provided, via leads 260 and 264, to OR-gate 140 (FIG. 1). The output of OR-gate 140 is, in turn, provided, via lead 138, to the set input of interrupt flip/flop 136. A change in mode bit 0 or mode bit 1 will generate a "high" signal at the output of gate 140 and set interrupt flip/flop 136, causing a "low" signal to be applied from the Q* output of flip flop 136, via lead 134, to the interrupt input of processor 104.

In accordance with conventional microprocessor operation, in the presence of an interrupt signal, microprocessor 104 stops its current processing operation, stores the status of the system and branches to a predetermined software routine. This predetermined software routine causes processor 104 to read the states of mode bit 0 and mode bit 1 which are provided, via leads 150, to processor input ports P1 and P2. From the values of these mode bits, processor 104 can determine whether processor 100 has attempted or will attempt to make a change in the system parameters which requires alternate parameters to be written into device-specific registers in controller 102. If so, as previously mentioned, processor 104 applies a "high" signal to its FLAG output which disconnects processor 100 and connects processor 104 to allow processor 104 to write the necessary changes to the registers in controller 102.

Processor 104 then proceeds to place appropriate address information on its data outputs D0–D7, and "low" signals on its A0 address output and R/W* output to cause a register in device 102 to be selected. Finally, the alternate information to be written into the selected register is placed on leads D0–D7, a "low" signal is placed on the processor's R/W* output and a "high" signal is placed on the A0 address output to cause the alternate information to be written into the selected register.

Operation in this alternate mode continues until all necessary parameters are written into the peripheral device registers. Processor 104 then restores the last register address code written to the index register of CRT controller 102 by processor 100 so that there will be no interruption in the operation of processor 100 when its operation resumes. This latter address code, as will be hereinafter described, is temporarily stored in address decoder and register 220 during the interrupt process and can be read by processor 104 via its input ports P5–P12. Processor 104 writes that value into the index register of CRT controller 102.

After restoring the index register, processor 104 then writes a logical "1" to its output port P4 which causes a "high" CLRIRQ signal to be generated on lead 148. This "high" signal is applied to the reset input of flip/flop 136 via lead 146 and resets the flip/flop. Processor 104 also generates a "low" FLAG signal which re-connects processor 100 to the peripheral unit and discontinues the WAIT signal provided to processor 200 by gate 242. The system is then in its normal operating mode.

In FIG. 2, address decoder and register 220 and gates 232, 233 and 242 are used to disable the signal CRTCS* which the processor 200 uses to enable the controller 102 in the case of an attempted write access by processor 200 to a device-specific register.

More particularly, as will be discussed in detail below, address decoder and register 220 governs the access of processor 200 to CRT controller 102 by monitoring the address values to be sent to the index register in CRT controller 102 by processor 200. If an address value indicates that processor 200 has attempted or will attempt an access to a non device-specific data register in CRT controller 102, the output signal CPUADDOK* generated by logic 220 selectively enables the generation of the CRT controller chip select signal CRTCS* for a data register access through gates 232 and 233. Alternatively, if the signal CPUADDOK* indicates that processor 200 has or is attempting to access a device-specific register in CRT controller 102, then gates 232 and 233 are controlled to prevent processor 200 from generating the CRT controller chip select signal CRTCS*.

This latter circuitry prevents processor 200 from changing the contents of registers in device 102 which contain device-specific parameters. In particular, as previously mentioned, when the address code on address leads A0–A15 is applied to address decoder 214, it generates "low" signals on one of its output leads which signals are used to enable various circuits in the system. In the case where processor 200 is attempting to access the CRT controller, the address signals on processor leads A0–A15 cause decoder 214 to generate either a "low" 6845ADDREG* signal or a "low" 6845DATREG* signal on either of its output leads 219 or 217, respectively. The 6845ADDREG* signal is generated if the processor is attempting to access the index register in the CRT controller, while the 6845DATREG* signal is generated if the processor is attempting to access any of the data registers. The "low" 6845ADDREG* signal is applied to the upper input of gate 226. The lower input of gate 226 receives a "low" signal via leads 208 and 224 from the read/write output (R/W*) of processor 200. Thus, in the event that processor 200 is attempting an access to the CRT controller index register, gate will be enabled to apply a "low" signal, via lead 228, to the clock input of address decoder and registor 220. The index register address on processor data bus 210 is thus clocked into the register portion of address decoder and register 220 and temporarily stored.

The "low" 6845ADDREG* signal is also provided to the upper input of gate 233, in turn, causing it to generate a "low" CRTCS* signal which, as previously discussed, enables the CRT controller to receive the register address.

In the event that processor 200 is attempting to write data into one of the CRT controller registers other than the index register, decoding circuitry in address decoder and register 220 is used to determine whether access is being attempted to a device-specific register. If so, then the generation of the CRTCS* signal is inhibited so that processor 104 can program the CRT controller registers. More specifically, in addition to a storage register, address decoder and register 220 contains conventional combinatorial logic which decodes the stored address to determine whether an access is being attempted to a device-specific register.

If the stored index register address indicates that access is being attempted to a non device-specific register, then address decoder and register 220 generates a "low" CPUADDOK* signal at its output 230. This "low" signal is applied to the upper input of gate 232. In the case of a data access, gate 232 receives a "low" 6845DATREG* signal from address decoder 214 at its lower input, via lead 234. Gate 232 is thus enabled and generates a "low" output signal on lead 235 which, in turn, causes gate 233 to generate the CRT controller enabling signal CRTCS*.

Alternatively, if processor 200 is attempting an access to a device-specific register, address decoder and register 220 generates a "high" CPUADDOK* signal on its output lead 230 which "high" signal disables gate 232. Gate 232, in turn, places a "high" signal on its output 235 which disables gate 233 and prevents the CRT controller enable signal CRTCS* from being generated.

After the secondary processor 104 determines that changes must be made to the CRT controller registers, it causes processor 200 to temporarily halt its operation to allow processor 104 to have sufficient time to perform the necessary changes.

In particular, the "high" FLAG signal on the P3 port of processor 104, which as previously described, is used to transfer control of CRT controller 102 from processor 100 to processor 104, is also applied to the input of inverter 238, causing inverter 238 to apply a "low" signal, via lead 240, to the upper input of gate 242. In the case of any access to the CRT controller registers by processor 100, gate 242 receives a "low" signal at its lower input from lead 241 which "low" signal is generated by gate 239 (gate 239 "OR"s the signals 6845ADDREG* and 6845DATREG* generated by address decoder 214 in the event that an access is attempted to CRT controller 102 by processor 200). Gate 242 thus produces a "low" signal at its output (CPUWAIT*) which signal is applied, via lead 202, to the WAIT input of processor 200. In accordance with conventional microprocessor operation, this signal causes processor 200 to temporarily halt operation while secondary CPU 104 is writing the appropriate parameters into the device-specific registers in CRT controller 102.

What is claimed is:

1. In a data processing system having a first processor generating address and data signals, at least one peripheral unit having a plurality of registers for storing parameter data which controls the operation of said peripheral unit, at least selected ones of said registers being device specific registers, and means responsive to said address and said data signals for transferring said parameter data from said first processor to said registers, apparatus for allowing a software program written for use with a different peripheral unit to operate with said peripheral unit, said apparatus comprising means responsive to said address and said data signals for generating a flag signal when said parameter data is being transferred from said first processor to said device specific registers;

means responsive to said flag signal for temporarily disconnecting said first processor from said peripheral unit; and means responsive to said address and data signals for providing and writing alternate parameter data into said device specific registers.

2. In a data processing system, apparatus for allowing a software program written for use with a different peripheral unit to operate with said peripheral unit according to claim 1 wherein said providing and writing means comprises a second processor.

3. In a data processing system, apparatus for allowing a software program written for use with a different peripheral unit to operate with said peripheral unit according to claim 2 wherein said generating means includes means responsive to said data signals for alerting said second processor that said first processor has attempted or will attempt to access said device specific registers, said second processor thereupon generating said flag signal.

4. In a data processing system, apparatus for allowing a software program written for use with a different peripheral unit to operate with said peripheral unit according to claim 3 wherein said peripheral unit requires an enable signal to operate and said generating means further includes means responsive to said data signals for preventing said first processor from forwarding an enable signal to said peripheral unit.

5. In a data processing system, apparatus for allowing a software program written for use with a different peripheral unit to operate with said peripheral unit according to claim 2 wherein said disconnecting means includes a plurality of gate means responsive to said flag signal for disconnecting said first processor from said peripheral unit and for connecting said second processor to said peripheral unit.

6. In a data processing system, apparatus for allowing a software program written for use with a different peripheral unit to operate with said peripheral unit according to claim 1 including a mode register for storing mode parameters which control the operation of said data processing system, and wherein said second processor includes means for examining the contents of said mode register to determine whether said first processor has attempted to access said device specific registers.

7. In a data processing system, apparatus for allowing a software program written for use with a different peripheral unit to operate with said peripheral unit according to claim 1 wherein said peripheral unit includes second registers for storing data affecting non-device specific operations of said peripheral unit and said apparatus further includes logic means which enables said first processor to access said second registers.

8. In a data processing system, apparatus for allowing a software program written for use with a different peripheral unit to operate with said peripheral unit according to claim 7, including a mode register for storing mode parameters which control the operation of said data processing system, and wherein said flag generating means includes means responsive to a change in the contents of said mode register for alerting said second processor that said first processor has attempted or will attempt to access said device specific registers.

9. In a data processing system having a first processor generating address, data and an enable signal, at least one peripheral unit having a plurality of registers for storing device-specific parameter data which controls the operation of said peripheral unit, a data bus connecting said processor and said registers for transferring said parameter data from said first processor to said registers, and means responsive to said enable signal for causing parameter data on said data bus to be written into said registers, apparatus for allowing a software program written for use with a different peripheral unit to operate with said peripheral unit, said apparatus comprising, a second processor,
means responsive to changes in selected ones of said data signals for alerting said second processor that said first processor has attempted or will attempt to write parameter data into said registers, said second processor thereupon generating a flag signal,
first gate means connected in said data bus between said first processor and said peripheral unit and responsive to said flag signal for temporarily disconnecting said first processor from said peripheral unit, and
means responsive to said address and data signals for generating an alternative enable signal and for writing alternate parameter data from said second processor into said registers.

10. In a data processing system, apparatus for allowing a software program written for use with a different peripheral unit to operate with said peripheral unit according to claim 9, including a mode register for storing mode parameters which control the operation of said data processing system, and wherein said second processor includes means for examining the contents of said mode register to determine whether said first processor is attempting to access said registers.

11. In a data processing system, apparatus for allowing a software program written for use with a different peripheral unit to operate with said peripheral unit according to claim 10 wherein said peripheral unit includes additional registers for storing data affecting non-device specific operations of said peripheral unit and said apparatus further includes logic means which enables said first processor to access said additional registers.

12. In a data processing system, apparatus for allowing a software program written for use with a different peripheral unit to operate with said peripheral unit according to claim 10 wherein said alerting means includes means responsive to a change in the contents of said mode register for alerting said second processor that said first processor has attempted or will attempt to access said registers.

13. In a data processing system, apparatus for allowing a software program written for use with a different peripheral unit to operate with said peripheral unit according to claim 9 further comprising second gate means connected between said first processor and said peripheral unit and responsive to said data signals for temporarily disconnecting said enable signal from said peripheral unit.

14. A data processing system comprising,
a first processor having means for generating address signals, data signals and control signals,
at least one peripheral unit having a plurality of registers for storing device-specific parameter data which controls the operation of said peripheral unit,
a data bus connecting said first processor and said registers for transferring said parameter data from said first processor to said registers,
means responsive to one of said control signals generated by said first processor for enabling parameter data on said data bus to be written into said registers,
a mode register for storing parameters which control the operation of said data processing system,
a second processor having means for generating data and control signals,
means responsive to changes in mode signals stored in said mode register for alerting said second processor that said first processor has attempted or will attempt to write parameter data into said registers, said second processor thereupon generating a flag signal,
first gate means connected in said data bus between said first processor and said peripheral unit and responsive to said flag signal for temporarily disconnecting said first processor from said peripheral unit, and
a multiplexer, responsive to said flag signal for disconnecting the control signals generated by said first processor from said peripheral unit and for connecting data and control signals generated by said second processor to said peripheral unit, said second processor thereupon writing alternate parameter data into said registers.

15. A data processing system, according to claim 14 wherein said peripheral unit includes additional registers for storing data affecting non-device specific operations of said peripheral device and said second processor does not generate said flag signal when said first processor accesses said additional registers.

16. A data processing system according to claim 15 further comprising an address decoder responsive to said address signals generated by said first processor for generating an enable signal for enabling operation of said peripheral unit, said enable signal passing through said multiplexer.

17. A data processing system according to claim 16 further comprising means responsive to said enable signal and to predetermined data patterns on said data bus for disconnecting said enable signal from said multiplexer so that said first processor can only access predetermined registers in said peripheral device.

18. A data processing system according to claim 17 wherein said alerting means comprises means for generating a pulse signal each time a change occurs in said mode register contents and means responsive to said pulse signal for generating an interrupt signal and for providing said interrupt signal to said second processor.

19. A data processing system according to claim 17 wherein said second processor comprises means responsive to said interrupt signal for examining the contents of said mode register to determine if said first processor has attempted or will attempt to access registers containing device-specific parameters.

* * * * *